United States Patent
Roh et al.

(10) Patent No.: US 7,009,920 B2
(45) Date of Patent: Mar. 7, 2006

(54) TRACK-SYNCHRONOUS AUDIO SIGNAL RECORDING METHOD AND APPARATUS

(75) Inventors: Seung Phil Roh, Pajoo-si (KR); Jae Wan Park, Pyungiaek-si (KR); Sung Woo Park, Daegu-si (KR)

(73) Assignee: LG Electronics Inc., Seoul (KR)

( * ) Notice: Subject to any disclaimer, the term of this patent is extended or adjusted under 35 U.S.C. 154(b) by 649 days.

(21) Appl. No.: 10/188,917

(22) Filed: Jul. 5, 2002

(65) Prior Publication Data

US 2003/0039190 A1    Feb. 27, 2003

(30) Foreign Application Priority Data

Jul. 6, 2001  (KR)  ................................. 2001-40507
Jul. 6, 2001  (KR)  ................................. 2001-40508

(51) Int. Cl.
*G11B 5/09*    (2006.01)

(52) U.S. Cl. ................................ 369/47.11; 369/47.12; 369/47.13; 369/47.15; 369/47.18; 369/83

(58) Field of Classification Search ............... 369/47.1, 369/47.11, 47.12, 47.13, 47.46, 53.1, 53.16, 369/53.2, 53.24, 53.31, 53.32, 53.44, 59.1, 369/83, 84
See application file for complete search history.

(56) References Cited

U.S. PATENT DOCUMENTS 5,422,868 A * 6/1995 Koizumi et al. ......... 369/47.22

* cited by examiner

*Primary Examiner*—Muhammad Edun
(74) *Attorney, Agent, or Firm*—Birch, Stewart, Kolasch & Birch, LLP

(57) ABSTRACT

The present invention relates to method and apparatus of recording an audio signal composed of several tracks on a recording medium in a manner that the tracks can be distinguished each other in a recorded audio signal. The present track-synchronous recording method detects a no-sound interval longer than a predetermined time that is included in an input audio signal during recording the input audio signal, and records an audio signal following the detected no-sound interval with a different track number from that of recorded audio signal preceding the detected no-sound interval. Therefore, it is possible to individually distinguish tracks on a copy medium even though those not having any track information are copied thereto from an original at a time.

31 Claims, 5 Drawing Sheets

*Related Art*

NSS : No-Sound Section

TRACK-SYNCHRONOUS AUDIO SIGNAL RECORDING METHOD AND APPARATUS

BACKGROUND OF THE INVENTION

1. Field of the Invention

The present invention relates to a method and apparatus of recording an audio signal composed of several tracks on a recording medium in a manner that the tracks can be distinguished from each other in the recorded audio signal.

2. Description of the Related Art

FIG. 1 is a simplified block diagram of a conventional disk recorder. The disk recorder of FIG. 1 includes an optical pickup 11 writing/reading signal to/from a writable disk 10 such as a CD-R; an A/D converter 13 digitizing an input audio signal; a recording processor 12 converting digital audio data to corresponding writing signals suitable to disk record; a servo unit 15 controlling rotation speed of the disk 10 and conducting tracking/focusing servo operation for the pickup 11; and a controller 14 controlling all elements to conduct audio signal record according to user's request.

The disk recorder configured as above records a digital or an analog audio signal on the writable disk 10. The audio signal inputted to the disk recorder may be a series of digital audio data reproduced from a disk recording medium such as a CD-R, a CD-R/W or the like, or may be an analog audio signal reproduced from an analog medium such as a cassette tape.

When recording is requested, the controller 14 commands the recording processor 12 to start writing input data. The recording processor 12 adds redundancy data for error correction to the input digital audio data and then converts them to corresponding writing signals. The optical pickup 11 radiates a writing beam, of which intensity varies in proportion to the writing signals, onto the writable disk 10.

If an analog audio signal is inputted, it is converted to digital data by the A/D converter 13 and is then applied to the recording processor 12. The recording processor 12 records the converted digital data on the writable disk 10 through the aforementioned operations.

The disk recorder records an entire input audio signal as a single track regardless of how many tracks (i.e., songs) the input audio signal includes. For example, as shown in FIG. 2, if recording is requested at p1 after audio data are inputted, all tracks #m, #m+1, #m+2, . . . on an original medium are recorded as a single track #k on a copy medium. In the example of FIG. 2, the recorded single track #k includes latter part of track #m, and several tracks thereafter of an original medium.

In the example of FIG. 3 for an analog input, tracks #m, #m+1, . . . , which have been distinguished each other on an original medium, are copied as a single track #k onto another medium from recording start p2 until the recording stops.

Because several tracks are recorded as a single track as aforementioned, inner tracks inside the single track can not be indexed with an individual track number. Therefore, the number of tracks are not matched with actual songs recorded on a copy medium. Because of that mismatch, the inner track, previously indexed by #m+1, can be played back through several manual advance skips or by tedious waiting after the track #k is played back.

For resolving such a problem, an intelligent recording method has been proposed. The intelligent method, in case that track information is received together with digital audio data, checks the track information to know whether track of input audio data is changed or not, and records audio data following the recorded input data as a next track to distinguish respective tracks when the track information is indicative of track change in a series of audio data.

Track change in recorded data can be identified by information written in sub-Q code column of subcode block each 8 bits of which are inserted in audio data periodically at a given interval, as shown in FIG. 4 showing compact disk recording standard. The sub-Q column is composed of 98-bit-long frames shown in FIG. 5 and track number is written in the field 'TNO' of every frame. Same track number is repeatedly written in the field 'TNO' in successive frames until recorded audio data are changed in track.

If input data consisting of subcode block as well as audio data as shown in FIG. 4 are received, the sub-Q column is checked to know whether the track is changed or not. When the information written in the sub-Q column is indicative of a track change, the next data following the recorded data are recorded with a different track number. Consequently, a copy medium has the same recorded tracks as an original medium.

However, if input audio data from an original medium does not have track information such as subcode block or an analog audio signal is inputted from an original source, it is still impossible to distinguish respective tracks during recording, and thus, several tracks are recorded as a single track as shown in FIG. 2 or 3.

SUMMARY OF THE INVENTION

It is an object of the present invention to provide a track-synchronous recording method and apparatus that divides input audio signal into respective tracks to make a copy medium have the same recorded tracks as an original even though the input audio signal is received without any track information.

A track-synchronous recording method conducted by an audio recorder in accordance with the present invention is characterized in that it comprises the steps of: detecting a no-sound interval longer than a predetermined time that is included in an input audio signal while recording the input audio signal; and recording an audio signal following the detected no-sound interval with a different track number from that of recorded audio signal preceding the detected no-sound interval.

An audio recorder for conducting a track-synchronous record in accordance with the present invention is characterized in that it comprises: a signal writer writing an input audio signal on a recording medium; a no-sound detector detecting a no-sound interval longer than a predetermined time that is included in the input audio signal; and a controller controlling said signal writer to record the audio signal following the no-sound interval detected by said no-sound detector with a different track number from that of recorded audio signal preceding the detected no-sound interval.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFERRED EMBODIMENT

In order that the invention may be fully understood, a preferred embodiment thereof will now be described with reference to the accompanying drawings.

Figure 6:
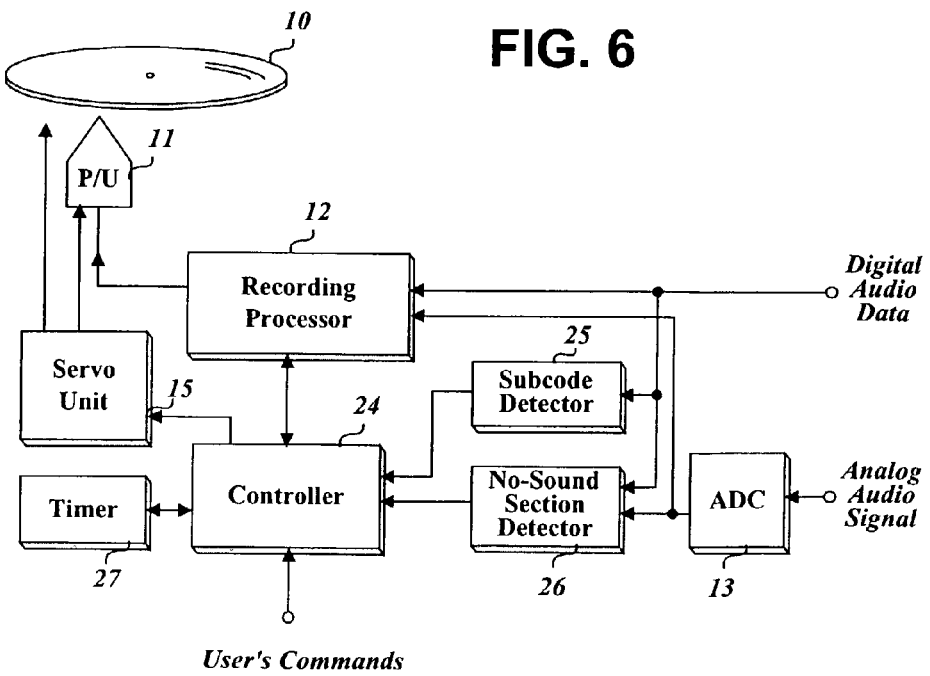
FIG. 6 is a block diagram of a preferable embodiment of a disk recorder in which a track-synchronous recording method is embedded according to the present invention.

FIG. 6 is a block diagram of a preferable embodiment of a disk recorder in which a track-synchronous recording method is embedded according to the present invention.

Figure 1:
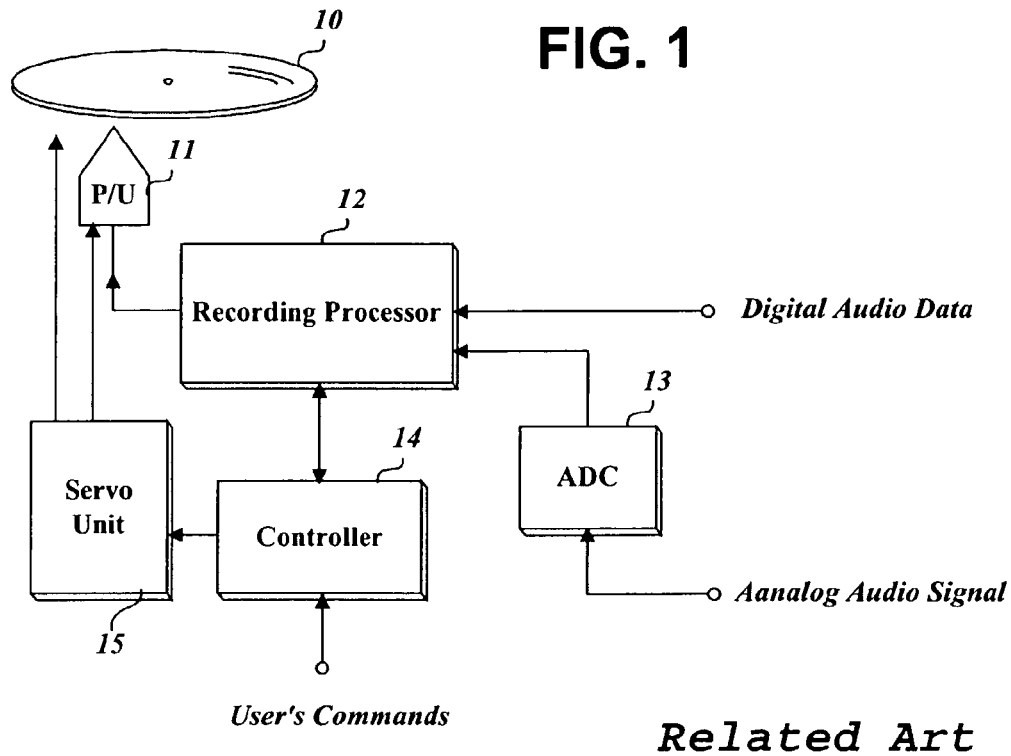
FIG. 1 is a simplified block diagram of a conventional disk recorder.
Figure 2:
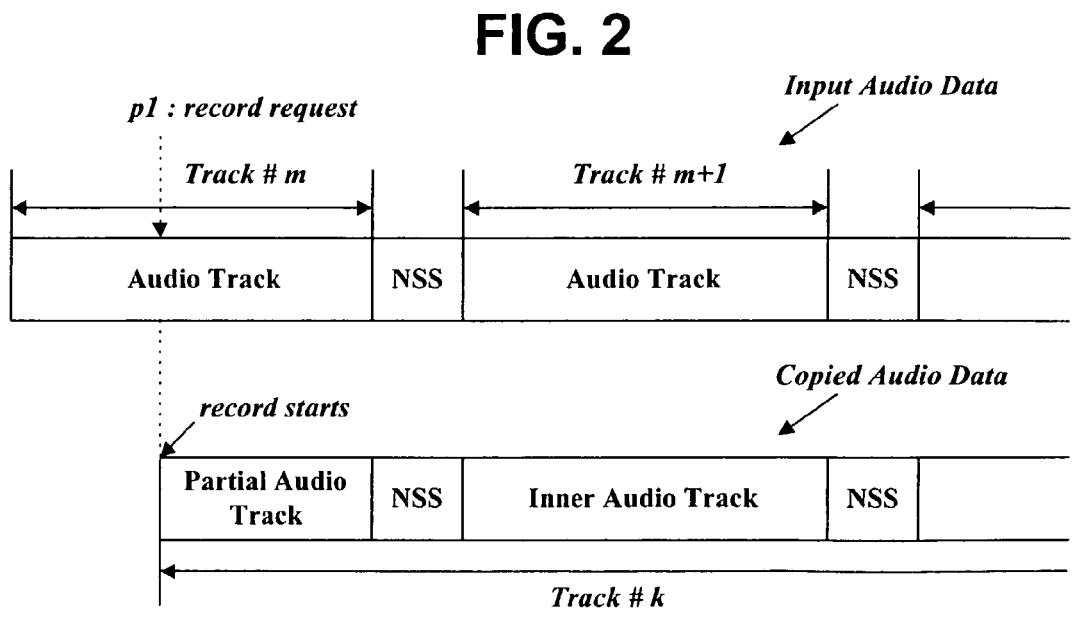
FIGS. 2 and 3 are illustrative recording examples of digital and analog audio input including several tracks that are recorded by a conventional disk recorder.
Figure 3:
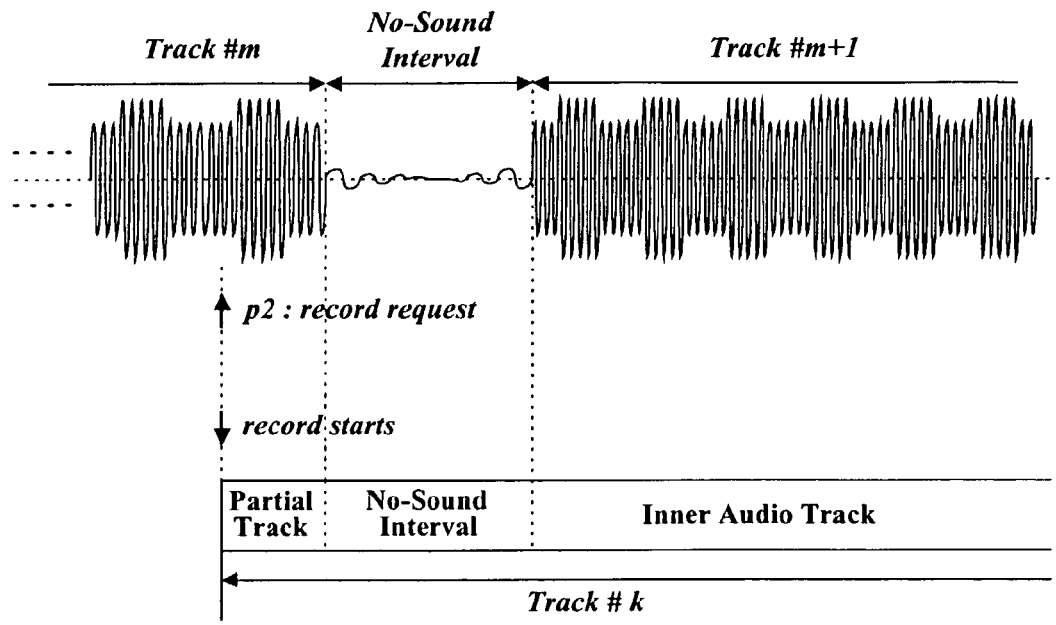

The disk recorder of FIG. 6 includes an optical pickup 11; a recording processor 12; an A/D converter 13; and a servo unit 15 that conduct the same functions as in the disk recorder of FIG. 1. The disk recorder of FIG. 6 further includes a subcode detector 25 detecting whether subcode data are included in input data or not and extracting, if included, frames containing track information from the subcode data; a no-sound section detector 26 detecting no-sound intervals that exist on digital data inputted directly or digitized by the A/D converter 13 by comparing a signal level with a given threshold; a timer 27 counting time from beginning at a request; and a controller 24 conducting overall control operations of the above elements to conduct a track-synchronous recording method at a user's request.

Figure 4:
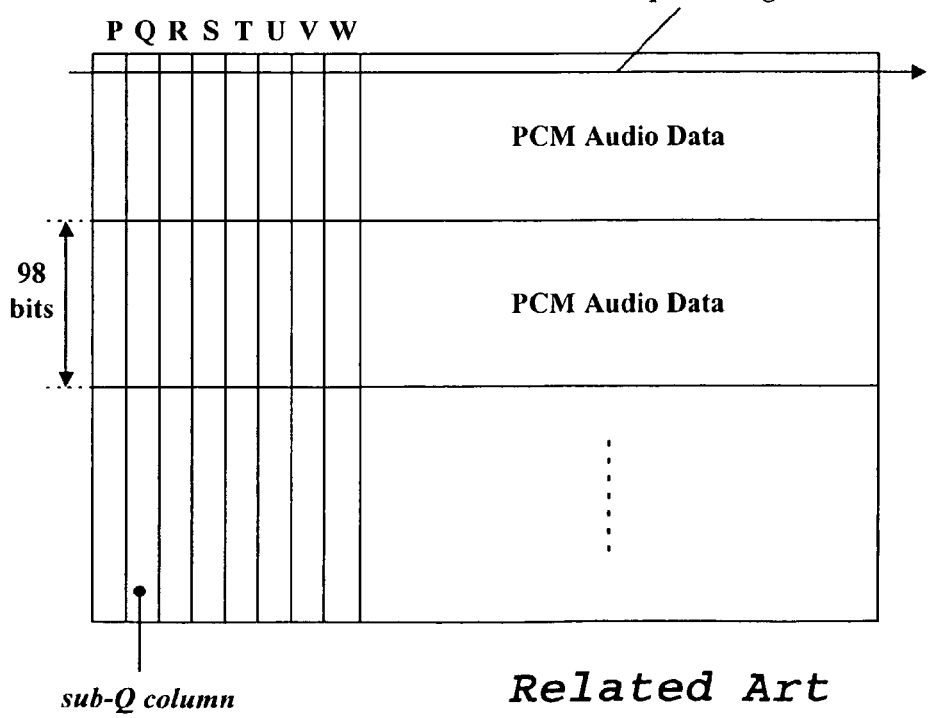
FIGS. 4 and 5 show recording format and sub-Q frame of a subcode block, respectively, that are defined in a compact disk recording standard.
Figure 5:
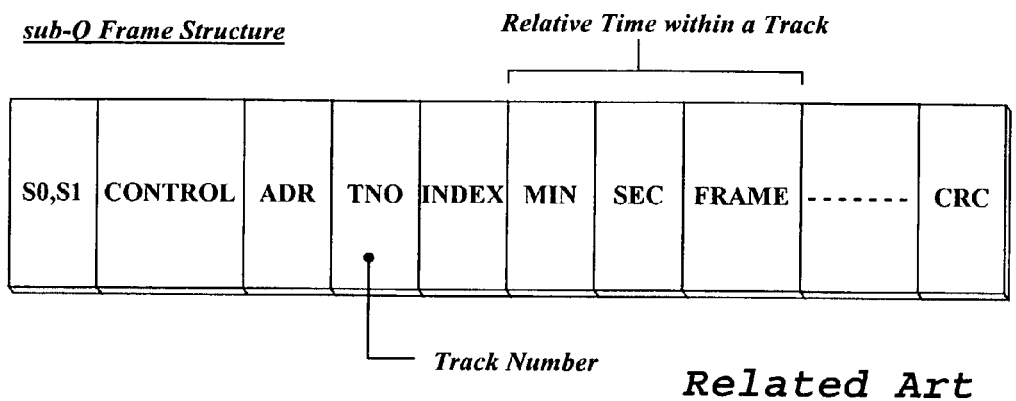

When digital audio data are inputted, the subcode detector 25 checks the input audio data to determine whether they are formatted in a given scheme such as FIG. 4. If matched with a given scheme, the subcode detector 25 extracts data of the sub-Q code column configured as FIG. 5 from the input audio data and delivers them to the controller 24. However, if not matched, the subcode detector 25 notifies the controller 24 that there is no subcode data.

In the meantime, the no-sound section detector 26 compares the input audio data with a threshold level. If a signal below the threshold level is detected, the no-sound section detector 26 sends the controller 24 a 'no-sound start' and 'no-sound end' signal that indicate the start and end of the interval below the threshold.

In case of synchronous recording mode, when data recording is requested, the controller 24 conducts the following operations to divide input audio data or analog signal into respective tracks during recording depending on the information and signals provided by the subcode detector 25 and the no-sound section detector 26 and the time-length of the no-sound interval.

Figure 7:
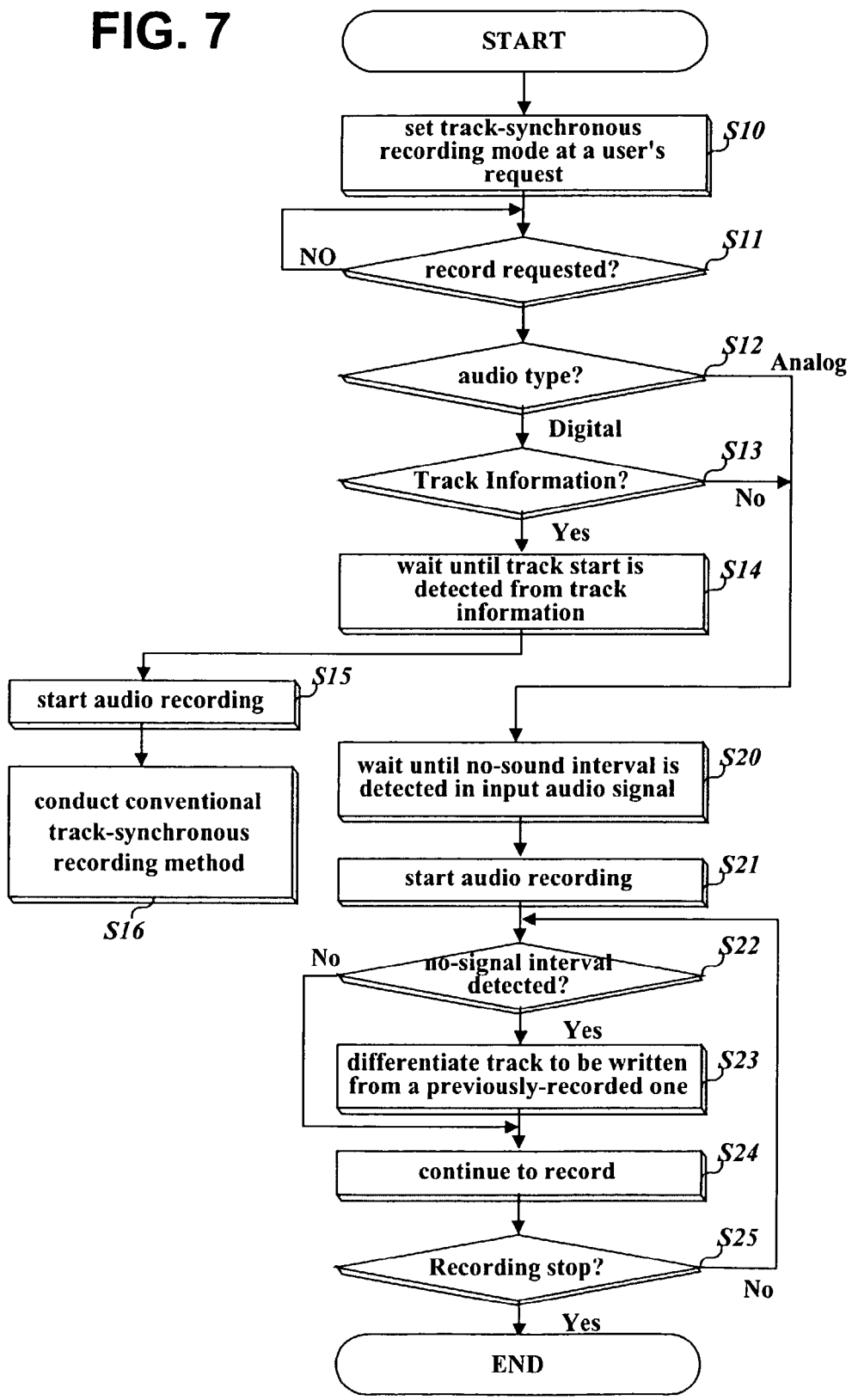
FIG. 7 is a flow chart of a preferable embodiment of a track-synchronous recording method according to the present invention.

FIG. 7 is a flow chart of a preferable embodiment of a track-synchronous recording method according to the present invention.

First, the controller 24 sets a recording mode to a synchronous mode at a user's request (S10). Afterwards, when a record button is pressed (S11) the controller 24 suspends recording operation not starting record immediately. Instead, it checks which type (i.e., digital or analog) of audio signal is inputted (S12).

If digital audio data are inputted, the controller 24 examines the output information from the subcode detector 25. If the output information is a series of sub-Q code frames (S13), the controller 24 observes the information 'MIN/SEC/FRAME' written in each frame to know whether a new track starts in the input audio data (S14). The moment new track starts, the controller 24 commands the recording processor 12 to start recording of the input audio data (S15).

Afterwards, the controller 24 continues to check the output information from the subcode detector 25 to know whether the track of the audio data is changed. If the track is changed, the controller 24 changes the track number in successive sub-Q frames associated with audio data to be written. In other words, track-synchronous recording is performed (S16). At this time, no-sound data, e.g., null data are preferably created and recorded for a while, e.g., 2 seconds before the track-changed input audio data are recorded.

If it is informed from the subcode detector 25 that subcode data are not included in the input audio data (S13), the controller 24 measures a time length of a no-sound interval notified by the no-sound section detector 26. For measuring the time length, the controller 24 starts the timer 27 when a 'no-sound start' signal is received, and stops the timer 27 when a 'no-sound end' signal is received. Then, the controller 24 reads the time value of the timer 27. If the read time value is longer than a preset threshold time, e.g., 1.5 seconds, namely, if a no-sound section is detected (S20), the controller 24 commands the recording processor 12 to start recording of input audio data (S21). The recording processor 12 records input data from the position the no-sound section detector 26 judges as end of no-sound. That is because the position is a substantial start of a track.

It is preferable to make a no-sound interval of a predetermined time length, e.g., 2 seconds before recording the input audio data.

While input audio data are recorded, the controller 24 creates subcode data about the audio data being recorded and provides them to the recording processor 22. The recording processor 12 combines the received subcode data and the input audio data to format to FIG. 4, and then records them on the writable disk 10.

While the input audio data are recorded, the controller 24 continues to measure a time length between a 'no-sound start' and a 'no-sound end' signal received from the no-sound section detector 26. If the measured time length is longer than the preset threshold (S22), the controller 24 makes input audio data following just-recorded data a next track. Namely, it increases the track number in subcode data associated with the input audio data to be recorded (S23).

When the track is changed, the controller 24 creates a 2-second no-sound data and provides the data to the recording processor 12 to insert it between two tracks. The inserted no-sound data are only reproduced without any sound in playback. Instead of inserting no-sound data intentionally, the no-sound interval included in the input audio data may be written as it is to form a no-sound section between distinguished two tracks.

The above track-synchronous recording is conducted until recording is stopped (S24–S25).

Figure 8:
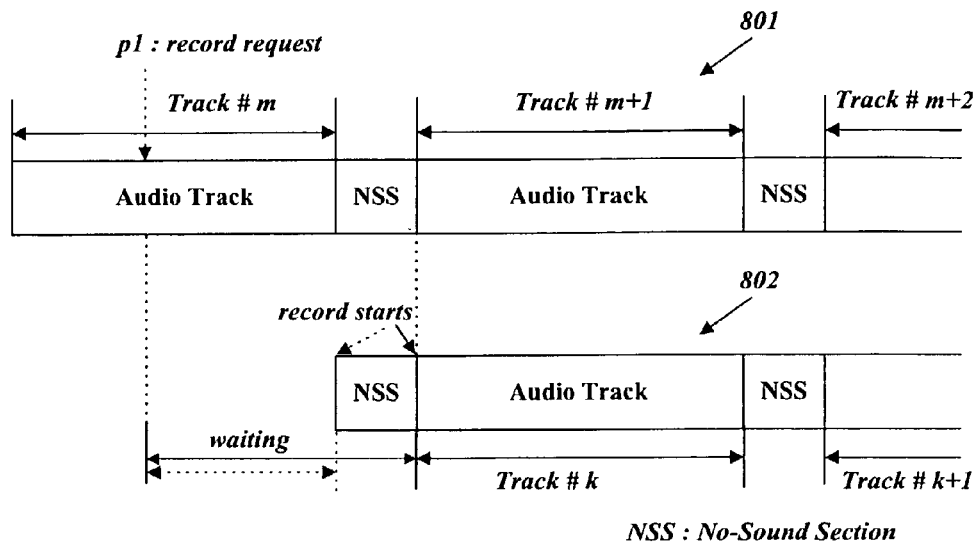
FIGS. 8 and 9 show recording examples in case that synchronous recording is requested at an arbitrary time while digital or analog audio signal is received from an original medium.

Through the above track-synchronous recording method, input audio data are recorded as illustratively shown in FIG. 8. FIG. 8 shows a recording example in case that synchronous recording is requested at p1 while input audio data 801 are received from an original medium. In the example of FIG. 8, the recorded audio data 802 have been divided into several tracks even though a series of audio data are recorded at a time.

The recording processor 12 has an inner memory for buffering input audio data, thus, it buffers audio data being inputted in the inner memory while the created no-sound data are written. After the writing of no-sound data is completed, the recording processor 12 records the audio data buffered in the inner memory on the target medium 10. Instead of recording no-sound data, the no-sound section can be formed by a 2-second physically erasing process of the optical pickup 11.

If an analog audio signal is inputted from outside (S12), the controller 24 disregards the output of the subcode detector 25. Instead, it judges whether there is a no-sound interval longer than the preset threshold based on the signals 'no-sound start' and 'no-sound end' from the no-sound section detector 26 (S20).

If there is a no-sound interval, the controller 24 commands the recording processor 12 to start recording of audio data digitized from an input analog signal (S21). It is preferable to make a no-sound interval of a predetermined time length, e.g., 2 seconds before recording the digitized audio data.

While the input audio data are recorded, the controller 24 continues to measure a time length between a 'no-sound start' and a 'no-sound end' signal received from the no-sound section detector 26. If the measured time length is longer than the preset threshold (S22), the controller 24 distinguishes by track number the digitized audio data to be recorded from the just-recorded data followed by the digitized audio data. Namely, it increases the track number in subcode data associated with the digitized audio data to be recorded (S23).

Figure 9:
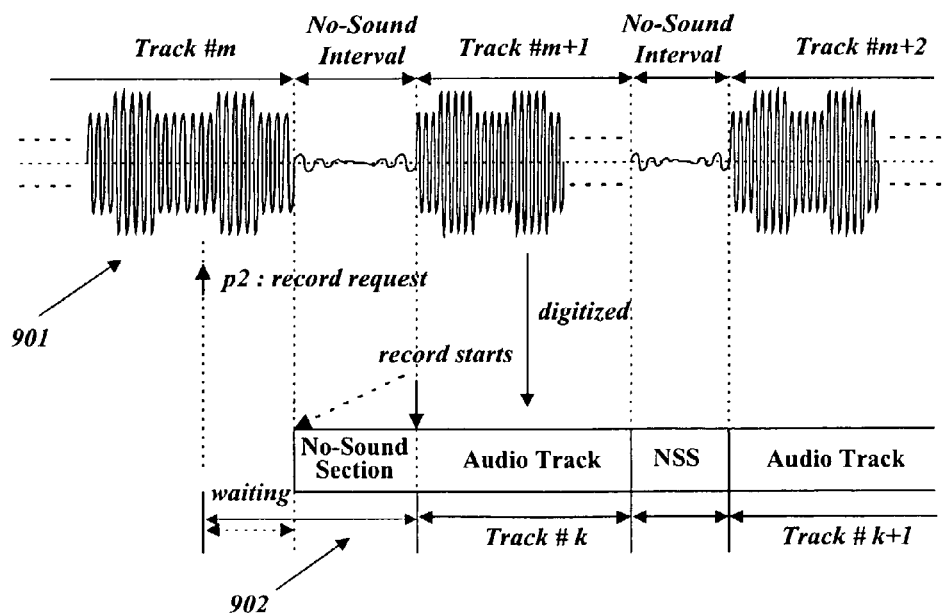

Through the above-explained track-synchronous recording method, input audio data are recorded as illustratively shown in FIG. 9. FIG. 9 shows a recording example in case that synchronous recording is requested at p2 while an analog input audio signal 901 is received from an original medium. In the example of FIG. 9, the recorded audio data 902 have been divided into several tracks, the same as the example of FIG. 8, even though an analog audio signal is recorded at a time.

The above-explained track-synchronous recording method and apparatus can record digital or analog audio signal without track information on a recording medium as dividing respective tracks. Therefore, the present invention makes it possible to individually distinguish tracks on a copy medium even though those are copied thereto without any track information from an original at a time.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A track-synchronous recording method of an audio recorder, comprising:
  detecting a no-sound time interval of an input audio signal when the input audio signal is an analog signal, and detecting if division information exists in the input audio signal when the input audio signal is a digital signal, said no-sound time interval and division information indicating the input audio signal includes sub-audio units; and
  determining whether or not a new sub-audio unit needs to be generated based on the detecting step.

2. The method of claim 1, further comprising:
  recording an audio signal on a recording medium to include a different track number for each sub-audio unit in the input audio signal; and
  recording null data as a no-sound section between each track number.

3. The method of claim 2, wherein the different track number is greater by 1 than a previous track number assigned to the recorded audio signal.

4. The method of claim 2, further comprising:
  recording the track number in a sub-Q frame of a subcode block defined in a compact disk recording format.

5. The method of claim 1, further comprising:
  waiting until a no-sound time interval is detected from the input audio signal, when recording is requested; and
  starting, if a no-sound time interval is detected, recording of the input audio signal from an end of the detected no-sound interval.

6. The method of claim 1, wherein when the detecting step detects the input digital audio signal has no division information, the method further comprises:
  detecting a no-sound time interval in the digital audio signal; and
  recording the digital audio signal to a recording medium to include a different track each time a no-sound time interval is detected.

7. The method of claim 1, wherein the no-sound time interval comprises a time interval where a signal level of the input audio signal is below a given threshold for a predetermined amount of time.

8. An audio recorder for conducting a track-synchronous record, comprising:
  a signal writer configured to write an input audio signal on a recording medium;
  a detector configured to detect a no-sound time interval of an input audio signal when the input audio signal is an analog signal, and to detect if division information exists in the input audio signal when the input audio signal is a digital signal, said no-sound time interval and division information indicating the input audio signal includes sub-audio units; and
  a controller configured to determine whether or not a new sub-audio unit needs to be generated based on sub-audio units detected by the detector.

9. The audio recorder of claim 8, wherein the signal writer records an audio signal on the recording medium to include a different track number for each sub-audio unit in the input audio signal.

10. The audio recorder of claim 9, further comprising a converter converting the analog input signal to digital data.

11. The audio recorder of claim 9, wherein the different track number is greater by 1 than a previous track number assigned to the recorded audio signal.

12. The audio recorder of claim 9, wherein said controller creates null data and provides said signal writer with the created null data to record as a no-sound section between each track number.

13. The audio recorder of claim 9, wherein the signal writer writes the track number in a sub-Q frame of a subcode block defined in a compact disk recording format.

14. The audio recorder of claim 8, wherein, when recording is requested, said controller further commands said signal writer to wait until a no-sound interval is detected from the input audio signal, and to start, if a no-sound interval is detected, recording of the input audio signal from end of the detected no-sound interval.

15. The audio recorder of claim 8, wherein the no-sound time interval comprises a time interval where a signal level of the input audio signal is below a given threshold for a predetermined amount of time.

16. A recording method, comprising:
   determining whether an input audio signal is a digital audio signal or an analog audio signal;
   detecting if division information exists in the input audio signal when the input audio signal is the digital audio signal, said division information indicating the digital audio signal includes sub-audio units; and
   determining whether or not a new sub-audio unit needs to be recorded based on the detecting step.

17. The method of claim 16, further comprising:
   detecting a no-sound time interval of the input audio signal when the input audio signal is the analog audio signal or when the input audio signal is the digital audio signal and no division information exists in the digital audio signal.

18. The method of claim 17, further comprising:
   recording the input audio signal to a recording medium only after the no-sound time interval is detected.

19. The method of claim 18, wherein detecting the no-sound time interval continues detecting the no-sound time interval of the input audio signal, and wherein recording the input signal records the audio signal on the recording medium to include a different track number for each sub-audio unit between respective no-sound time intervals.

20. The method of claim 19, wherein the different track number is greater by 1 than a previous track number assigned to the recorded audio signal.

21. The method of claim 19, further comprising:
   recording the track number in a sub-Q frame of a subcode block defined in a compact disk recording format.

22. The method of claim 19, further comprising:
   recording null data as a no-sound section between each track number.

23. The method of claim 17, wherein the no-sound time interval comprises a time interval where a signal level of the input audio signal is below a given threshold for a predetermined amount of time.

24. An audio recorder, comprising:
   a processor configured to determine whether an input audio signal is a digital audio signal or an analog audio signal;
   a sub-audio unit detector configured to detect if division information exists in the input audio signal when the input audio signal is the digital audio signal, said division information indicating the digital audio signal includes sub-audio units; and
   determining whether or not a new sub-audio unit needs to be recorded based on the division information detected by the sub-audio unit.

25. The recorder of claim 24, further comprising:
   a no-sound detector configured to detect a no-sound time interval of the input audio signal when the input audio signal is the analog audio signal or when the input audio signal is the digital audio signal and no division information exists in the digital audio signal.

26. The recorder of claim 25, further comprising:
   a recorder configured to record the input audio signal to a recording medium only after the no-sound detector detects the no-sound time interval.

27. The recorder of claim 26, wherein the no-sound detector continues detecting the no-sound time interval of the input audio signal, and wherein the recorder records on the recording medium a different track number for each sub-audio unit between respective no-sound time intervals.

28. The recorder of claim 27, wherein the different track number is greater by 1 than a previous track number assigned to the recorded audio signal.

29. The recorder of claim 27, wherein the recorder records the track number in a sub-Q frame of a subcode block defined in a compact disk recording format.

30. The recorder of claim 27, wherein the recorder records null data as a no-sound section between each track number.

31. The recorder of claim 25, wherein the no-sound time interval comprises a time interval where a signal level of the input audio signal is below a given threshold for a predetermined amount of time.

* * * * *